United States Patent [19]
Shobert, II

[11] 3,937,992
[45] Feb. 10, 1976

[54] PULSE KEYBOARD SWITCH
[75] Inventor: Erle I. Shobert, II, St. Marys, Pa.
[73] Assignee: Stackpole Carbon Company, St. Marys, Pa.
[22] Filed: Nov. 18, 1974
[21] Appl. No.: 522,026

[52] U.S. Cl. .................................. 310/15; 310/30
[51] Int. Cl.² .................................. H02K 35/06
[58] Field of Search .............................. 310/12–15, 310/30

[56] References Cited
UNITED STATES PATENTS

| | | | |
|---|---|---|---|
| 3,065,366 | 11/1962 | Speiser et al. | 310/15 |
| 3,130,332 | 4/1964 | Zehfeld et al. | 310/15 |
| 3,132,268 | 5/1964 | Abel et al. | 310/15 |
| 3,153,735 | 10/1964 | Branagan et al. | 310/15 |
| 3,398,302 | 8/1968 | Harnau et al. | 310/14 |
| 3,693,033 | 9/1972 | Troesly | 310/14 |
| 3,718,828 | 2/1973 | Britton et al. | 310/15 |
| 3,774,058 | 11/1973 | Abel | 310/15 |

*Primary Examiner*—Donovan F. Duggan
*Attorney, Agent, or Firm*—Brown, Murray, Flick & Peckham

[57] ABSTRACT

The switch includes an annular permanent magnet, a plate of soft magnetic material at one side of the magnet, a stationary electric coil at the opposite side of the magnet, and an unrestrained free-flying member of soft magnetic material coaxial with magnet and coil and movable axially in them toward and away from the plate. It normally is held by keeper means in a rest position away from the plate, but means are provided movable relative to it for first engaging and then pushing it toward the plate until the magnetic attraction between the magnet and the free-flying member causes that member to fly from the pushing means to the plate at high velocity. This creates a rapid change in flux in the free-flying member and produces a voltage pulse in the coil.

5 Claims, 5 Drawing Figures

PULSE KEYBOARD SWITCH

There are patents on electric switches that generate electric pulses by the rapid movement of an armature of soft magnetic material through a coil toward or away from a permanent magnet. When the armature moves toward the magnet, the air gap between them is reduced and there is a sudden change in flux in the armature resulting from its rapid movement. This generates a voltage in the coil that can be used for producing a switching signal for activating electronic equipment, such as an electric typewriter or data processing equipment. In most of such switches the armature strikes the face of the permanent magnet. It has been found that by making certain changes as disclosed in this specification and the accompanying drawings, the voltage output for a pulse generating switch can be increased many times.

Of some interest is Zehfeld et al. U.S. Pat. No. 3,130,332, which has a soft iron pole plate 3 on top of the magnet and a projection 9 of the plate extending into the central passage through the magnet. The armature 7 normally engages the projection, but moves rapidly down away from it when spring 11 is compressed sufficiently. Since the armature starts to move out of the magnet from zero velocity, the voltage pulse developed in the coil is not as great as it would be if it were possible for the armature to fly unrestrained from its lowest position upwardly toward projection 9. Such free flying of the armature is not possible because its upward movement is restrained by spring 11, and the spring is necessary for the operation of the patented pulse generator.

It is an object of this invention to provide a keyboard switch that produces a greatly increased voltage output as compared with similar switches known before, and that is simple and inexpensive in construction.

The invention is illustrated in the accompanying drawings, in which

Figure 1:
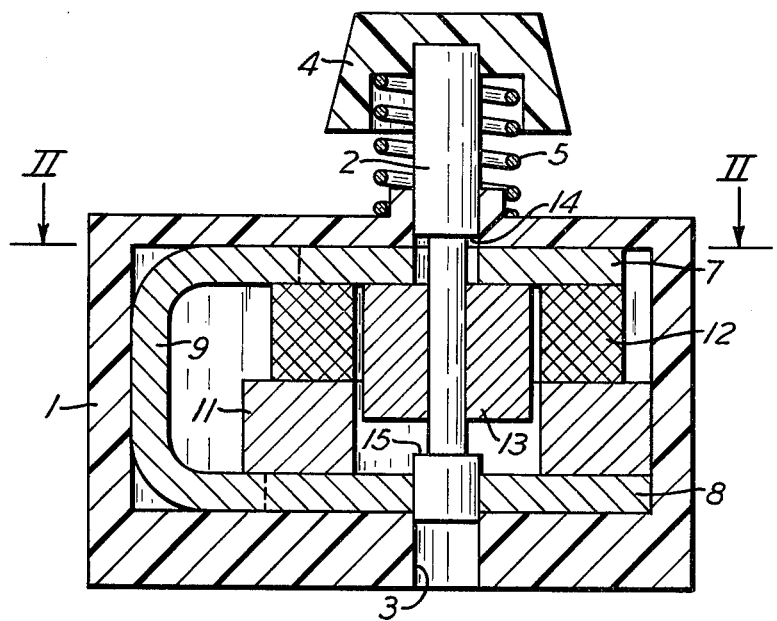
FIG. 1 is a central vertical section through the switch.
Figure 2:
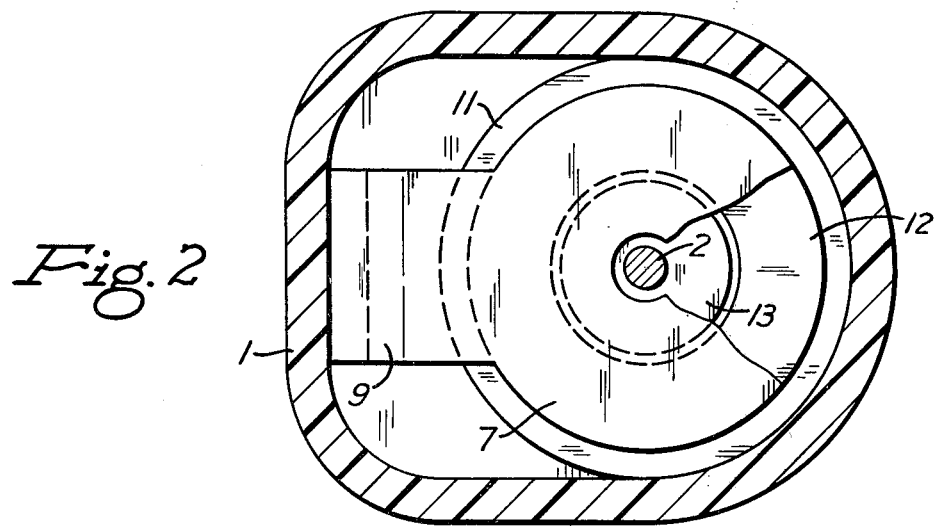
FIG. 2 is a horizontal section taken on the line II—II of FIG. 1.

Referring to FIGS. 1 and 2 of the drawings, a switch case 1 made of insulating material is provided in its top with a vertical passage, in which a nonmagnetic plunger 2 is slidably mounted. The bottom of the case is likewise provided with a vertical passage 3 in line with the upper passage and slidably receiving the lower end of the plunger to help guide it. The plunger extends above the case and a push button or key 4 is rigidly mounted on its upper end. The projecting portion of the plunger is encircled by a coil spring 5 that normally holds the key and plunger in their upper position as shown.

Inside of the case a plate of soft magnetic material 7, such as soft iron or a soft ferrite, is disposed against its upper wall. This plate is provided with a central opening through which the plunger extends. A similar plate 8 seats against the bottom wall of the case and likewise is provided with a central opening for the plunger. These two plates are magnetically connected, such as by a metal strap 9, the opposite ends of which are integral with the edges of the plates.

Seated on the lower plate 8 is an annular permanent magnet 11 that encircles the plunger but is spaced a considerable distance from it. Also encircling the plunger in the space between the top of the magnet and the upper plate there is an electric coil 12, the central opening of which registers with the opening through the magnet. Disposed in these two openings is a vertically movable member or armature 13 of soft magnetic material. The length of this armature is less than the distance between the two plates 7 and 8. Normally, the armature is held against the upper plate by magnetic attraction, so the lower end of the armature is spaced from the lower plate. Although the armature is shown projecting part way down into magnet 11, it is not necessary that it do so. This armature is slidably mounted on the central portion of the plunger, which is reduced in diameter to provide it with upper and lower radial shoulders 14 and 15 that overlap the top and bottom of the armature a slight distance but normally are spaced from it. The upper plate 7 serves as a keeper for normally holding the armature in its upper position, because the flux from the magnet is sufficient for that purpose.

Figure 3:
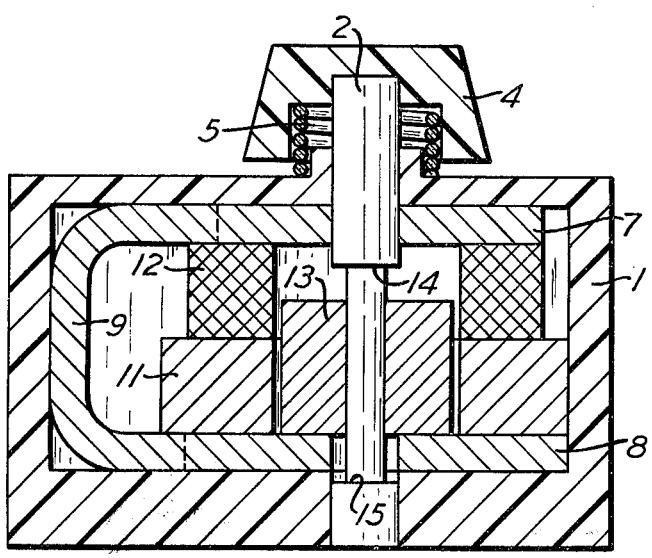
FIG. 3 is a view similar to FIG. 1, but showing the switch key depressed.

When the armature is in its upper or normal rest position, as shown in FIG. 1, both plunger shoulders are spaced from it. The same thing is true when the plunger is in its lower position and the armature is in engagement with the lower plate 8, as shown in FIG. 3. When the key is depressed while the armature is in its upper position, the upper shoulder 14 of the plunger will be moved down into engagement with the top of the armature and then will push it downwardly away from the upper plate 7 far enough for magnet 11 to attract the armature strongly enough to pull it down the plunger at high velocity and against the lower plate 8. That is, when the magnetic attraction of the magnet overcomes the attraction of the upper plate for the armature, the latter will be free to slide down away from its upper plunger shoulder. It will be seen that there is nothing between the upper shoulder and the lower plate to restrain the descent of the armature at that time, so it can be referred to as free flying toward the lower plate, which stops it. The armature is free to fly at a speed determined by its own weight and the magnetic field induced in it by the magnet and the lower plate toward which it is flying. The movement of the armature is not restrained in any way by a spring.

When the key is released, the coil spring will lift the lower shoulder of the plunger into engagement with the bottom of the armature and raise the armature away from the lower plate until it is attracted magnetically to the upper plate 7, toward which it will fly away from the lower shoulder on the plunger and thus return to its normal upper position shown in FIG. 1. The flying of the armature in either direction is independent or free of any spring force. It is free flying.

What is accomplished electrically by operation of the switch will now be explained. While the armature 13 is in its upper position it extends most or all of the way through the coil 12, but in its lower position the armature cannot extend more than part way through the coil as shown in FIG. 3. While the armature is up, the magnetic field generated by the permanent magnet is primarily external to the magnet, but when the armature drops into the hole in the magnet and engages the lower plate the field then is forced to take the shortest path and goes through the armature and the lower soft iron plate. The result is that many more lines of flux cut the coil than in switches of this general type known heretofore. When the armature flies toward the lower plate, the air gap between them is eliminated and there is a sudden change in flux in the armature that results from its rapid movement. This generates a voltage pulse in the coil, which can be used for producing a signal. In fact, it has been found that more than 10 times the voltage output is obtained than is the case where a flying armature strikes the end of a magnet instead of entering it. Since the armature is being drawn toward the lower plate instead of being forced away from it, the armature accelerates as it moves toward the plate, whereby the air gap between them is reduced at a constantly increasing velocity. This is another reason why the voltage pulse is stronger with the switch just described.

The time and duration of the voltage pulse generated in the coil is determined by the design of the switch and not by the way in which the key is depressed or released. By this is meant that once the key has been depressed or released a certain distance, the action of the switch is taken out of the control of the operator. This is because the armature then flies ahead faster than the plunger moves in the same direction.

Figure 4:
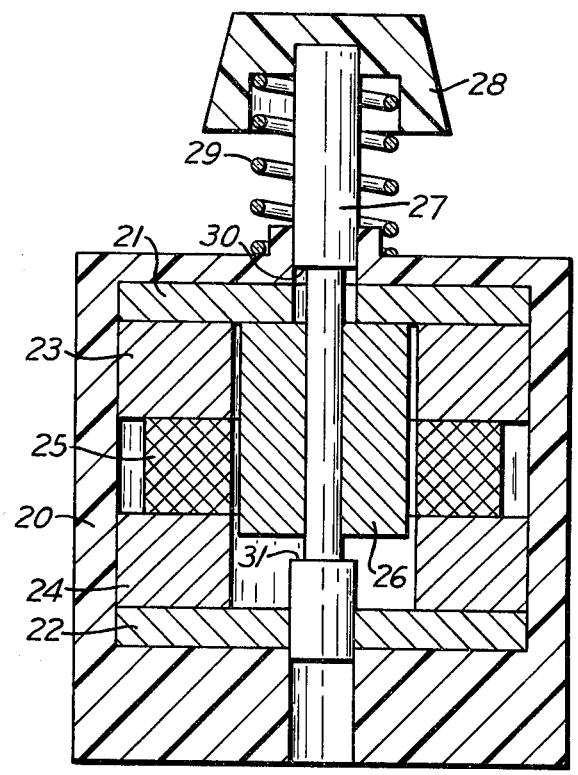
FIGS. 4 and 5 are views similar to FIGS. 1 and 2, respectively, of a modification.
Figure 5:
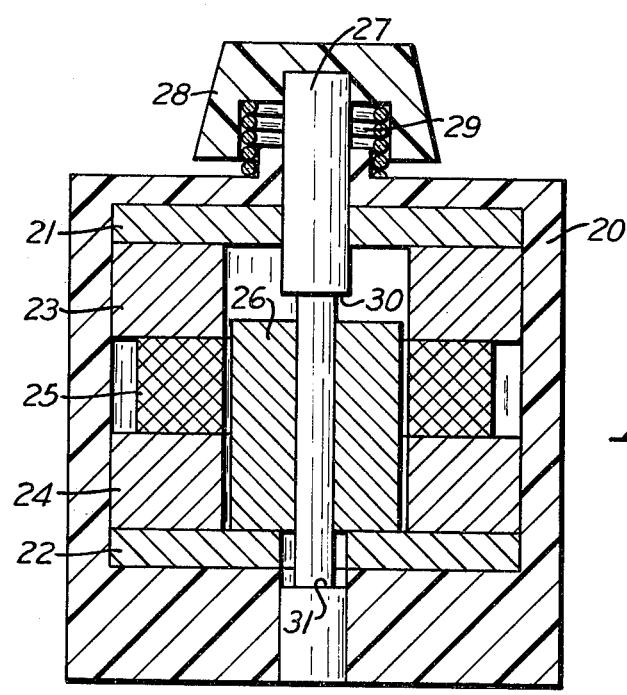

In the modification shown in FIGS. 4 and 5, the case 20 contains upper and lower soft iron plates 21 and 22 as before, but they are not magnetically connected. Instead, there is an upper permanent magnet 23 as well as a lower permanent magnet 24. These two magnets are opposed to each other; that is, if the bottom of the upper magnet happens to be its south pole, then the lower magnet is disposed with its south pole at the top. The coil 25 is between the two magnets. Movable vertically in these last three annular elements there is an armature 26, which normally is held against the upper plate 21 by magnetic attraction. The armature is spaced from the lower plate 22 and does not necessarily have to extend all of the way through the coil. It is slidably mounted on a vertical plunger 27 that can move up and down in the case. A key 28 is mounted on the projecting upper end of the plunger and normally is held in its upper position by a coil spring 29.

When the key is depressed, the upper shoulder 31 on the plunger first engages the top of the armature and then pushes it down until the attraction of the lower magnet overcomes the attraction of the upper magnet, whereupon the armature flies down through the lower magnet and against the lower soft iron plate. In doing so, there is a sudden change in flux in the armature, which generates a voltage pulse in the coil.

When the key is released and the spring raises the plunger, its lower shoulder 32 lifts the armature until the attraction of the upper magnet for the armature overcomes the attraction of the lower magnet. This causes the armature to fly up through the upper magnet and against the upper plate 21 and generate another voltage pulse in the coil in the opposite direction.

Whether the armature is flying down or up, in each direction of unrestrained movement it reduces and closes an air gap between it and a soft iron plate at the far side of a magnet at a constantly increasing velocity.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A pulse keyboard switch comprising an annular permanent magnet having an open center, a plate of soft magnetic material disposed against one side of said magnet, a stationary electric coil at the opposite side of the magnet and coaxial therewith, the coil having an open center, an unrestrained free-flying member of soft magnetic material coaxial with said magnet and coil, said member being small enough to move axially in the open centers of said coil and magnet toward and away from said plate, keeper means normally holding said free-flying member in a predetermined rest position away from the plate, means movable relative to the free-flying member for first engaging and then pushing that member toward said plate until the magnetic attraction between said magnet and free-flying member causes said member to fly from said pushing means through said magnet to said plate at increasing high velocity, whereby a rapid change in flux in said free-flying member is created and produces a voltage pulse in said coil, and movable means for returning said member to said keeper means, said returning means being spaced from said free-flying member while it is flying to said plate.

2. A pulse keyboard switch according to claim 1, in which said pushing means includes a plunger extending freely through said free-flying member, said plunger and free-flying member being provided with overlapping radial surfaces that are separated while the free-flying member is flying.

3. A pulse keyboard switch according to claim 1, in which said keeper means includes a second annular permanent magnet, and a plate of soft magnetic material disposed against the side of said permanent magnet farthest from the coil, said magnets being magnetized longitudinally with a pole of one magnet opposed to the end of the other magnet having the same polarity.

4. A pulse keyboard switch according to claim 1, in which said keeper means is a plate of soft magnetic material magnetically connected with said first-mentioned plate.

5. A pulse keyboard switch according to claim 1, in which said keeper means is a plate of soft magnetic material connected with said first-mentioned plate by a rigid soft magnetic metal strip outside of said magnet, coil and free-flying member.

* * * * *